United States Patent Office 3,701,660
Patented Oct. 31, 1972

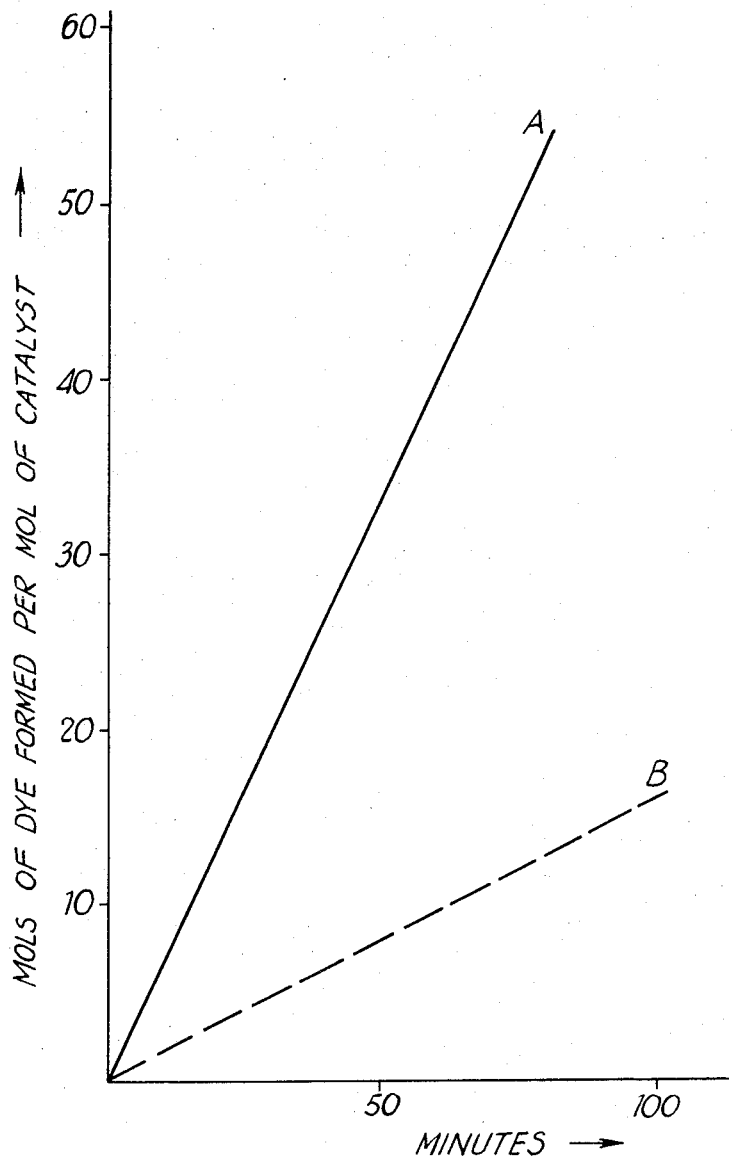

3,701,660
PHOTOSENSITIVE ELEMENT CONTAINING PHOTOLABILE COBALT OR IRON COMPLEX AND THE USE THEREOF IN COLOR DEVELOPMENT
John Macdonald Pratt, Whitegate, and Brian Ronald David Whitear, Ilford, England, assignors to Imperial Chemical Industries Limited, London, and Ilford Limited, Ilford, England
Filed Oct. 21, 1970, Ser. No. 82,724
Int. Cl. G03c 5/24; G03 1/48
U.S. Cl. 96—48 R                    4 Claims

ABSTRACT OF THE DISCLOSURE

This application describes a process for the production of a photographic image which comprises subjecting to light exposure a layer comprising a photolabile cobalt or iron complex of a specified formula and treating the exposed layer with compounds which, when one of them is oxidised, will react to form a coloured or black compound.

---

This invention relates to photographic processes and materials for use therein.

Most image-recording systems are based on the use of silver halide as the light-sensitive material though in recent years efforts have been made to develop non-silver systems, inter alia because of the high cost of silver.

However, most non-silver image recording systems sensitive to light are relatively slow photographically, that is, they require long exposure times, which limits their usefulness and detracts from their often simple methods of processing. This is because a relatively thick layer of the sensitive material is necessary to produce a visible image after exposure and processing. A very thin coating, which would be "faster," cannot be used because there is usually no means of multiplying the effect produced by a short exposure. For example in diazo systems, the diazonium salt is imagewise belached and the unexposed portions coupled to form a visible dyestuff. However, one only obtains one molecule of dye from one molecule of diazonium compound and it is known that the quantum efficiency of diazonium compounds is at best about 0.7. The quantum efficiency (QE) is defined by the formula:

$$QE = \frac{\text{Number of moles decomposed or transformed}}{\text{Number of quanta of light absorbed}}$$

Many other potential light-sensitive systems are worse than this by several orders of magnitude.

It is an object of the present invention to provide a system whereby on exposure and transformation of one molecular equivalent of a light sensitive compound there is produced more than one molecular equivalent of visible image dyestuff.

According to the present invention there is provided a process for the production of a photographic image which comprises subjecting to light exposure a layer comprising a photolabile cobalt or iron complex of the formula:

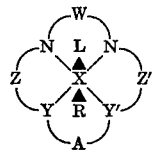

where X represents cobalt or iron in their higher oxidation state (III), Y and Y' each represent N, O or other hetero atom, R represents alkyl, substituted alkyl, allyl, aralkyl, aryl or substituted aryl, N and Y may be joined through Z to form a bidentate ligand, N and Y' may be joined through Z' to form a bidentate ligand, Z and Y being the same as or different from Z' and Y', N, Z and Y, N, Z' and Y'. when taken together may form part of a $\pi$ or delocalised $\pi$ system, N and N may be joined through another grouping, W, Y and Y' may be joined through another grouping A, and L may or may not be present, and treating the exposed layer with compounds which, when one of them is oxidised, will react to form a coloured or black compound.

When R is substituted alkyl it may be, for example, hydroxyalkyl. If L is present it may be, for example, selected from ammonia, amines, water, organic phosphine, alkyl or halogen. The metal complex may exist as a neutral compound, or as a cation or anion.

Cobalt or iron complexes as above defined are light sensitive. On exposure to light they acquire the characteristic of being an oxidation catalyst. Accordingly, by treating an imagewise exposed layer of a sized complex with compounds which, when one of them is oxidized, will react together, it arises that the oxidation takes place in an imagewise fashion and the reaction product is found in the areas which have been exposed to light (these being the areas where the oxidation catalyst exists). The invention will be described with particular reference to the cobalt complexes as being typical of the class.

As a result of the large amount of research carried out in recent years into the vitamin $B_{12}$ coenzyme complex, the structure is now known and surprisingly it contains an alkyl cobalt bond which is stabilised by various co-ordinating ligands. It is also light-sensitive. Various similar derivatives have been made where the naturally occurring cobalt alkyl group is replaced by a synthetic carbon chain. Such compounds are also light-sensitive. Many "model" compounds have been made in which the cobalt is complexed by a much simpler system than in the naturally occurring vitamin which stabilises the alkyl cobalt bond (in absence of light).

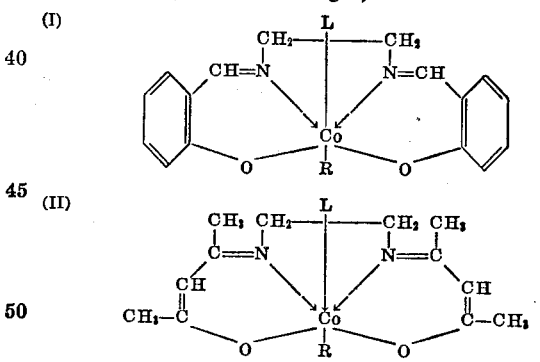

where L is only optionally present and R=alkyl or substituted alkyl or aryl. Compare the work of Costa et al., J. Organometal Chem. 6 (1966) p. 181 and 7 (1967), p. 493.

Another group of compounds is exemplified by Formula III

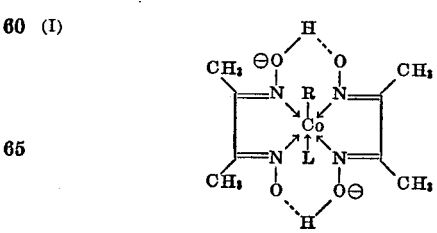

where R=alkyl or aryl or substituted alkyl and L is only optionally present. Compare Schrauzer and Windgosseo, J. Amer. Chem. Soc. 88, 3738 (1966).

Recently the very similar alkyl iron and alkyl cobalt aetioprophyrin I complexes of Formula IV have been prepared and all were found to be light sensitive:

(IV)
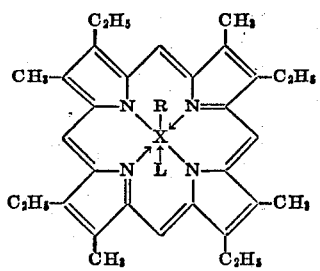

where X=cobalt or iron, R=alkyl, hydroxy alkyl or aryl, and L is only optionally present. Compare Johnson et al. J. Chem. Soc. (C) 1968, p. 882.

Other examples of light sensitive alkyl cobalt and/or iron compounds are those of the following formulae:

(V)
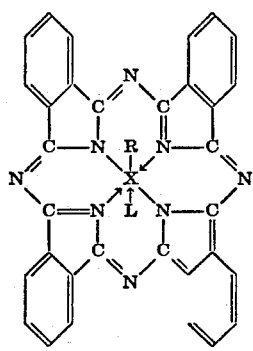

where X=cobalt or iron, R=alkyl, L is optionally present. R. Taube and M. Drews, Z. Chem. (1969), 9, p. 115.

(VI)
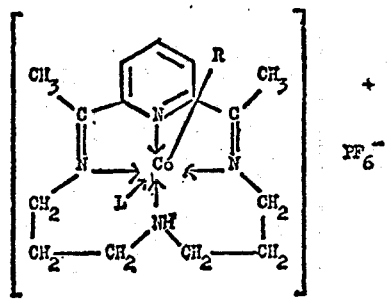

R=alkyl, allyl, aralkyl, L=halide. E. Ichiro and D. H. Busch, Chem. Comm. (1968), p. 905.

Further compounds are referred to by Pauson, Pure and Applied Chem. 17, No. 2 (1968), p. 236.

It is a well known process of colour photography to produce an image dye by developing an exposed silver halide in the presence of (1) an aromatic primary amino colour developing agent, of which the most commonly used are the N,N-disubstituted para phenyelne diamines, and (2) a colour coupler, being a compound which will couple with the oxidation products of the developing agent (produced as it develops the silver image) to yield a quinone-imine or azomethine dye.

According to a preferred form of the present invention the compounds used in the production of the image record, apart from the cobalt or iron complex derivative, are a said colour developing agent and a said colour coupler. In the presence of oxygen naturally present in the system, the colur developer is oxidised under the influence of the oxidation catalyst formed by the light exposure of the complex and so couples with the colour coupler to form a dye.

Conveniently the reaction may be effected at alkaline pH. Thus the reaction, by way of example, may be:

(A)
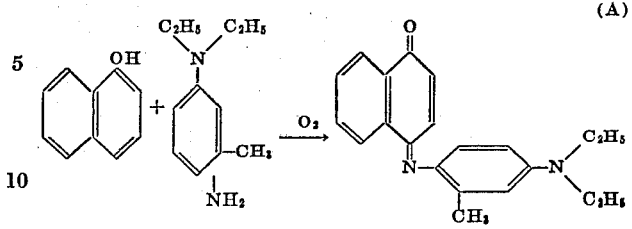

Dye (A) was prepared by an alternative method and its absorption characteristics measured: λ max. 655 nm., E=10,400.

To obtain some measure of the efficiency of the foregoing system the following test was carried out.

A solution of α-naphthol (0.075 g.) 4-N.N.diethylamino-2-methyl aniline hydrochloride (0.11 g.) and sodium acetate (2 g.) in 2-ethoxy ethanol (50 ml.), water (10 ml.) and ethanol (40 ml.) was prepared in the dark and air blown through the solution for 1 minute and then stopped. The ethyl cobalt compound B of the formula given below (B)
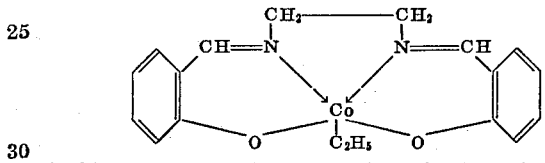

(1.65 mgm.) was added and when dissolved the mixture was given a short exposure to a 100 w. tungsten lamp. Dye formation was followed spectroscopically on 40× diluted samples. The final density corresponded with 100 molecular equivalents of dye based on the complex used, and this was the total amount of reactants added. With increased proportions of the developer and coupler the figure of 100 was exceeded. The qauntum efficiencies of some of the complexes have been measured and are similar to those of diazonium compounds (i.e. 0.2 to 0.7); hence photographic speeds of at least 100× may be obtained by the method of the present invention.

Various coatings have been made using substantially the same type of mixtures. It is preferred to coat the mixtures in an inert binder, for example cellulose acetate, to prevent migration of the catalyst. It is an advantage to use a substantive colour former so that leaching out of the dyestuff is prevented during the devolpment stage. This also enables developers to be formulated using organic solvent media.

It has been found that bubbling oxygen (e.g. as air) through the development solution increases the rate of dye formation.

The invention further includes photographic light-sensitive materials comprising the cobalt and iron complex derivatives defined above. More particularly the invention includes photographic light-sensitive materials which comprise a support and a layer of a cobalt or iron complex derivative as defined above, in an inert colloid medium, and such materials which further include a colour coupler in said layer or in an adjacent layer.

The following examples will serve to illustrate the invention:

EXAMPLE 1

A solution was prepared in the dark, as follows:

| | | |
|---|---|---|
| Colour coupler (cyan) | g | 1.0 |
| Ethyl cobalt compound of Formula B above | g | 0.05 |
| Cellulose triacetate | g | 2.20 |
| Diacetone alcohol | ml | 2.0 |
| Methyl ethyl ketone | ml | 100 |

The colour coupler used was an N-long-chain-alkyl-substituted anilide of naphthonic acid.

The solution was coated onto a film support and the coating dried while maintaining dark conditions. A sample was image-wise exposed in a lithographic printing frame for 1 minute and developed for 10 minutes in a developer comprising 4-N-N-diethylamino-2-methyl aniline hydrochloride (0.5 g.) anhydrous sodium acetate (2 g.), 2-methoxyethanol (50 ml.), ethanol (40 ml.) and water (10 ml.) containing dissolved oxygen. The film was washed with water and dried. A clearly visible cyan image was formed and had a density of almost 1.0.

The experiment was repeated, but as a comparison the imagewise exposure was carried out through a step wedge, so that one side received the full exposure (one minute) which reduced as the wedge increased to a density of 2.0, i.e. one hundredth of a minute. The developed image was clearly visible at all points although increased density was formed with increasing exposure. Under the same conditions a piece of slow bromide printing paper required 2 to 5 seconds exposure.

EXAMPLE 2

The ethyl cobalt complex (B) (0.25 g.) was dissolved in a little pyridine and the pyridine co-ordination complex precipitated by the addition of petroleum ether in the dark. It was filtered off, washed with petroleum and dried. A coating was prepared exactly as described in Example 1 except the complex was replaced with the one just described. The results were substantially the same except that the photographic speed appeared to be somewhat slower.

EXAMPLE 3

A piece of thick filter paper was moistened with water and then coated with a solution of the ethyl cobalt catalyst B (10 mgm.) in acetone (50 ml.) and dried. It was imagewise exposed and developed in a developer comprising 4-N-N-diethylamino-2-methylaniline hydrochloride (2 g.), α-naphthol (1 g.), sodium acetate (4 g.), ethanol (25 ml.) and water (200 ml.) at room temperature. The developed paper was washed and then dried. The image was clearly visible (blue) although some dye spread had occurred. The unexpected portions were fixed by treatment with a dilute potassium cyanide in weakly ammoniacal aqueous solution.

EXAMPLE 4

A piece of linen cloth was treated with a solution of 4-chloro-1-naphthol (1 g.) and ethyl cobalt$^{III}$ bis(salicylaldehyde) ethylene diimine complex (20 mgm.) in acetone (100 ml.) in the dark, then dried. It was imagewise exposed to light and developed in a developer comprising 4-N,N-diethylamino-2-methylaniline HCl (1 g.) sodium acetate (2 g.) methanol (10 ml.) and a little sodium carbonate to increase the pH to 9.5. The cloth was washed in water and dried leaving a blue image.

EXAMPLE 5

A piece of filter paper was coated with a solution of 4-chloro-1-naphthol (1 g.) phenyl cobalt$^{III}$ bis(salicylaldehyde)ethylene diimine complex (20 mgm.) in a mixture of acetone (50 ml.) and methanol (50 ml.) in the dark and allowed to dry. It was imagewise exposed, then developed for five minutes in the developer described in Example 4. The image formed was blue.

EXAMPLE 6

This example is substantially the same as Example 5, except that the catalyst was ethyl cobalt$^{III}$ bis(acetyl acetone)ethylene diimine complex. A similar result was obtained.

EXAMPLE 7

A solution of 4-chloro-1-naphthol (0.9 g.) 4-N-ethyl-N-2'-methylsulphonamido ethyl-2-methyl aniline (0.14 g.) sodium acetate (2 g.) and methyl aquo cobaloxime (2.5 mgm.) were dissolved in a mixture of ethanol (40 ml.), 2-methoxy ethanol (50 ml.), and water (10 ml.) and the pH adjusted to 10. Air was slowly blown through the solution and the mixture exposed to a 100 w. lamp. The formation of dye was followed spectrophotometrically showing a true catalytic effect, although the rate of protolysis was rather slow. A sample kept entirely in the dark room showed virtually no dye formation.

The catalytic activity of the photolysis products of the compounds used in the present invention is shown also by those same products when sythesised by alternative methods. The following examples where the processing may be effected in an atmosphere of nitrogen, illustrate this.

EXAMPLE 8

Bis-salicylaldehyde ethylenediimine (0.54 g.) was dissolved in hot 2-methoxy ethanol (10 ml.) and lithium hydroxide $H_2O$ (0.18 g.) added and shaken until dissolved. The solution was filtered and cobalt chloride $6H_2O$ (0.48 g.) dissolved in 2 methoxy ethanol (2 ml.) was added. The mixture was cooled and the product separated. It was collected, washed with ethanol and dried. The crystals were red-purple plates of cobalt bis(salicylaldehyde) ethylenediimine complex. In subsequent tests when used as an oxidation catalyst, it was shown to act in exactly the same was as the photolysis product of ethyl cobalt bis(salicylaldehyde) ethylene diimine complex.

EXAMPLE 9

Ferrous bis(salicylaldehyde) ethylenediimine complex. Bis-salicylaldehyde ethylenediimine (0.86 g.) was dissolved in a hot solution of lithium hydroxide $H_2O$ (0.26 g.) in water (2 ml.) and ethanol (5 ml.), and the mixture filtered. A solution of ferrous ammonium sulphate $6H_2O$ (1.26 g.) in water (10 ml.) was added and the iron complex separated as a cream coloured solid. It was filtered off, washed with alcohol and dried. It behaved as an oxidation catalyst.

The catalytic effect of two complexes used in the process of the present invention is shown in the accompanying graph. In this graph the ordinate values are mols of dye formed per mol of catalyst and the abscissae values are minutes. The graph lines are shown for two complexes as follows:

Line A

The compound of the formula:

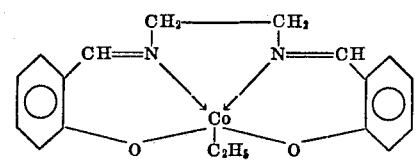

photolysed to remove the ethyl group.

Line B

The compound of the formula:

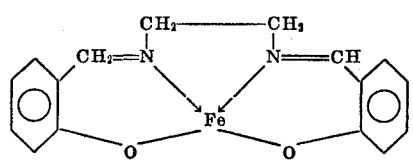

To prepare the graphical representations, a solution of 1-naphthol 0.02 M), 4 - N - ethyl - N-2' - methyl sulphonamidoethyl-2-methylaniline (0.1 M) and catalyst (A or B) (0.00005 M) was prepared in a mixture of ethanol (40 ml.) 2-methoxy ethanol (50 ml.) and water (10 ml.) containing sodium acetate (29) and the pH adjusted to 10.8 by the addition of sodium hydroxide. The rate of dye formation with time was followed spectrophotometrically.

We claim as our invention:

1. A process for the production of a photographic image which comprises subjecting to imagewise exposure a layer comprising a photolabile complex selected from the class consisting of complexes of the formula:

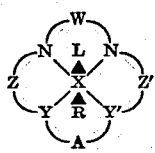

where X represents an element selected from cobalt and iron in its higher oxidation state (III), Y and Y' each represent an N or O atom, R represents a group selected from the class consisting of alkyl, hydroxy alkyl, allyl, aralkyl and aryl; said complexes wherein N and Y are joined through Z to form a bidentate ligand; said complexes wherein N and Y' are joined through Z' to form a bidentate ligand; said complexes wherein Z and Y are different from Z' and Y'; said complexes where N, Z and Y, and N, Z' and Y', when taken together form part of a $\pi$ or delocalised $\pi$ system; said complexes wherein N and N are joined through linking grouping W; said complexes wherein Y and Y' are joined through linking grouping A; said complexes wherein L is present and is selected from the class consisting of ammonia, amines, water, organic phosphines, alkyl and halogen; and said complexes wherein L is not present; and treating the exposed layer with an aromatic primary amino colour developing agent in the presence of a colour coupler, the latter being a compound which will couple with the oxidation products of the said developing agent to yield a quinone-imine or azomethine dye.

2. A process according to claim 1 wherein the complex is a compound of the formula:

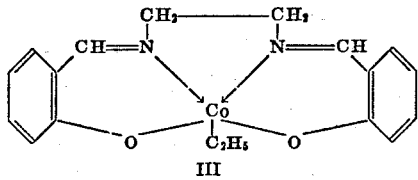

III

3. A process according to claim 1 wherein the said treatment is effected simultaneously with the provision of free oxygen gas to the reacting system.

4. A photographic light sensitive material which comprises a support carrying a layer comprising a photolabile complex selected from the class consisting of complexes of the formula:

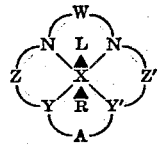

where X represents an element selected from cobalt and iron in its higher oxidation state (III), Y and Y' each represent a N or O atom, R represents a group selected from the class consisting of alkyl, hydroxy alkyl, allyl, aralkyl and aryl; said complexes wherein N and Y are joined through Z to form a bidentate ligand; said complexes wherein N and Y' are joined through Z' to form a bidentate ligand; said complexes wherein Z and Y are different from Z' to Y'; said complexes wherein N, Z and Y, and N, Z' and Y', when taken together form part of a $\pi$ or delocalised $\pi$ system; said complexes wherein N and N are joined through linking grouping W; said complexes wherein Y and Y' are joined through linking grouping A; said complexes wherein L is present and is selected from the class consisting of ammonia, amines, water, organic phosphines, alkyl and halogen; and said complexes wherein L is not present, the said layer containing the complex in an inert colloid medium and the said layer or an adjacent layer containing a colour coupler.

References Cited
UNITED STATES PATENTS 3,562,308   2/1971   Costa _____ 260—439

OTHER REFERENCES

Costa et al.: A New Photochemical Reaction of Organo-Cobalt(III) Complexes With Carbon Monoxide in Alcohol (1967), pp. 1781–1782.

J. TRAVIS BROWN, Primary Examiner

W. H. LOUIE, Jr., Assistant Examiner

U.S. Cl. X.R.

96—49, 76, 77, 88, 92; 260—439